US011065545B2

(12) United States Patent
DeVico

(10) Patent No.: US 11,065,545 B2
(45) Date of Patent: Jul. 20, 2021

(54) USE OF MACHINE LEARNING TO INCREASE OR DECREASE LEVEL OF DIFFICULTY IN BEATING VIDEO GAME OPPONENT

(71) Applicant: Sony Interactive Entertainment LLC, San Mateo, CA (US)

(72) Inventor: Matthew A. DeVico, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

(21) Appl. No.: 16/522,320

(22) Filed: Jul. 25, 2019

(65) Prior Publication Data

US 2021/0023453 A1 Jan. 28, 2021

(51) Int. Cl.
*A63F 13/67* (2014.01)
*A63F 13/798* (2014.01)

(52) U.S. Cl.
CPC ............ *A63F 13/67* (2014.09); *A63F 13/798* (2014.09)

(58) Field of Classification Search
None
See application file for complete search history.

(56) References Cited

U.S. PATENT DOCUMENTS

| 8,905,838 | B2* | 12/2014 | Kurabayashi | A63F 13/47 463/10 |
| 2005/0266921 | A1* | 12/2005 | Hayashida | A63F 13/10 463/33 |
| 2007/0111802 | A1* | 5/2007 | Ishihara | A63F 13/10 463/43 |
| 2007/0173333 | A1* | 7/2007 | Matsuhara | A63F 13/822 463/43 |
| 2008/0009352 | A1* | 1/2008 | Aoyama | A63F 13/358 463/43 |
| 2008/0119268 | A1* | 5/2008 | Kando | A63F 13/00 463/31 |
| 2008/0146335 | A1* | 6/2008 | Toriyama | A63F 13/10 463/37 |
| 2009/0325707 | A1* | 12/2009 | Ichimura | A63F 13/32 463/40 |
| 2010/0331084 | A1* | 12/2010 | Fuzell-Casey | A63F 13/69 463/31 |
| 2014/0149177 | A1* | 5/2014 | Frank | G06F 40/30 705/7.29 |
| 2014/0235326 | A1* | 8/2014 | Paracha | G06Q 10/101 463/25 |

(Continued)

OTHER PUBLICATIONS

International Search Report and Written Opinion dated Jul. 30, 2020 from the counterpart PCT application PCT/US2020/039612.

*Primary Examiner* — James S. McClellan
*Assistant Examiner* — Peter J Iannuzzi
(74) *Attorney, Agent, or Firm* — John L. Rogitz

(57) ABSTRACT

Machine learning is used to determine one or more video game players' ability to defeat a non-player video game opponent, such as a boss. The level of difficulty in beating the video game opponent may then be increased or decreased based on the players' ability to beat the video game opponent. In some examples, another player may then opt in to the increased or decreased level of difficulty, or may choose to play the video game without the increased or decreased level of difficulty.

11 Claims, 5 Drawing Sheets

(56) References Cited

U.S. PATENT DOCUMENTS

| | | | | |
|---|---|---|---|---|
| 2014/0237490 A1* | 8/2014 | Yoo | ................... | G06Q 10/101 |
| | | | | 719/329 |
| 2017/0266553 A1* | 9/2017 | Motohashi | ............ | A63F 13/812 |
| 2017/0333795 A1* | 11/2017 | Hardee | ................ | A63F 13/67 |
| 2019/0091582 A1* | 3/2019 | Reiche, III | ............ | A63F 13/795 |

* cited by examiner

400

SMART BOSS SETTINGS

- OPT IN TO INCREASING / DECREASING LEVEL OF DIFFICUTY IN BEATING BOSSES BASED ON MY JOYSTICK /BUTTON HABITS, MOVES, WEAPON USE, ETC. ⟵ 402

OR

- BEAT BOSS ALTERED FOR ONE OF THE FOLLOWING SETS OF VIDEO GAME PLAYERS ⟵ 404
  - GENERAL POPULATION ⟵ 406
  - MY FRIENDS LIST ⟵ 408
  - E-SPORTS
  - FPS
  - SIMULATION
  - RPG

} 410

OTHER SETTINGS:

- ALTER MID-GAME ⟵ 412
- ALTER AT NEXT CONSOLE STARTUP, GAME UPDATE, OR APPLICATION LAUNCH ⟵ 414
- ALTER WHEN BEGINNING NEW GAME ⟵ 416
- ONLY ALTER BOSSES ⟵ 418
- ALTER ALL NON-PLAYER OPPONENTS ⟵ 420

SELECT BOSSES FOR ALTERATION:

- ALL ⟵ 422
- LEVEL 1 BOSS ⟵ 424
- LEVEL 2 BOSS ⟵ 426
- FINAL LEVEL BOSS ⟵ 428

FIG. 4

USE OF MACHINE LEARNING TO INCREASE OR DECREASE LEVEL OF DIFFICULTY IN BEATING VIDEO GAME OPPONENT

FIELD

The application relates generally to technically inventive, non-routine solutions that are necessarily rooted in computer technology and that produce concrete technical improvements. In particular, the present application relates to use of machine learning to increase or decrease the level of difficulty in beating a non-player video game opponent.

BACKGROUND

Artificial intelligence-based machine learning is becoming increasingly sophisticated and robust. Additionally, the present application recognizes that consumers can realize increased value in a video game if they are able to replay the video game after beating it, but with variations relative to the first time the game was beat.

SUMMARY

The present application therefore also recognizes that machine learning, sometimes in the form of deep learning artificial neural networks, can be used for a variety of useful applications related to increasing or decreasing the level of difficulty in beating a non-player video game opponent such as a boss at the end of a video game. This can enhance a player's experience with a video game and provide a more robust and technology-savvy experience, while also giving the player more motivation to replay the video game even after beating it a first time.

Accordingly, in one aspect an apparatus includes at least one processor and at least one computer storage that is not a transitory signal. The computer storage includes instructions executable by the at least one processor to receive data related to one or more video game players' ability to defeat a video game opponent and to alter a level of difficulty of prevailing against the video game opponent based on the data. The video game opponent may be a virtual video game opponent controlled by a computer during gameplay rather than controlled by a person, and the level of difficulty may be altered by increasing or decreasing the level of difficulty.

In some implementations, the instructions may also be executable to transmit first data indicating the altered level of difficulty to one or more video game consoles or other consumer electronics (CE) devices, and to transmit second data indicating a reward for beating the video game opponent to the one or more video game consoles or other CE devices. The reward may vary with the level of difficulty of prevailing against the video game opponent. In certain examples, the reward may vary such that a higher level of difficulty of prevailing against the video game opponent may result in a greater reward, and a lower level of difficulty of prevailing against the video game opponent may result in a lesser reward. The reward may include, for example, a particular trophy, a particular medal, a particular amount of video game currency, a particular amount of video game points, and/or a particular amount of currency to spend via an electronic or e-commerce store.

If desired, the instructions may be executable to use artificial intelligence machine learning to analyze the data related to the one or more video game players' ability to defeat the video game opponent to identify successful and/or unsuccessful methods used by the one or more video game players to defeat the video game opponent. The instructions may then be executable to alter the level of difficulty based on the analysis.

In another aspect, a method includes receiving data related to one or more video game players' attempt to beat a video game opponent and determining, based on the data, a different way for beating the video game opponent in the future. The method also includes altering gameplay against the video game opponent based on the different way for beating the video game opponent in the future. The video game opponent may be a non-player character of a video game, such as a boss that is engaged at the end of a level or stage of the video game.

Further, in some examples the different way for beating the video game opponent in the future may be tailored to a particular video game player for play by the particular video game player to circumvent a particular attack or attack pattern waged against the video game opponent by the particular video game player. Additionally or alternatively, the different way for beating the video game opponent in the future may be tailored for play by multiple video game players in separate gameplay instances to circumvent a particular attack or attack pattern waged against the video game opponent by plural video game players.

Also, in some implementations the different way for beating the video game opponent in the future may be tailored based on a particular subset of video game players. The particular subset may be electronic sports video game players, first person shooter video game players, simulation video game players, and/or role playing game video game players.

The different way for beating the video game opponent in the future may also be tailored for increased or decreased joystick maneuver difficulty in beating the video game opponent. Additionally or alternatively, the different way for beating the video game opponent in the future may be tailored for increased or decreased push-button combination difficulty in beating the video game opponent.

In yet another aspect, an apparatus includes at least one computer readable storage medium that is not a transitory signal. The computer readable storage medium includes instructions executable by the at least one processor to initially install a version of a video game on a computer and to receive data from a server indicating one or more increased or decreased levels of difficulty in beating one or more opponents of the video game. The instructions are also executable to execute the video game in accordance with the one or more increased or decreased levels of difficulty in beating the one or more opponents.

In some examples, the instructions may also be executable to present a graphical user interface (GUI) on a display accessible to the at least one processor. The GUI may include an option permitting a player to opt in to playing the video game using the one or more increased or decreased levels of difficulty in beating the one or more opponents relative to the initially-installed version of the video game.

The details of the present application, both as to its structure and operation, can best be understood in reference to the accompanying drawings, in which like reference numerals refer to like parts, and in which:

BRIEF DESCRIPTION OF THE DRAWINGS

FIGS. 4 and 5 show example graphical user interfaces (GUIs) for configuring gameplay settings in accordance with present principles.

DETAILED DESCRIPTION

Figure 1:
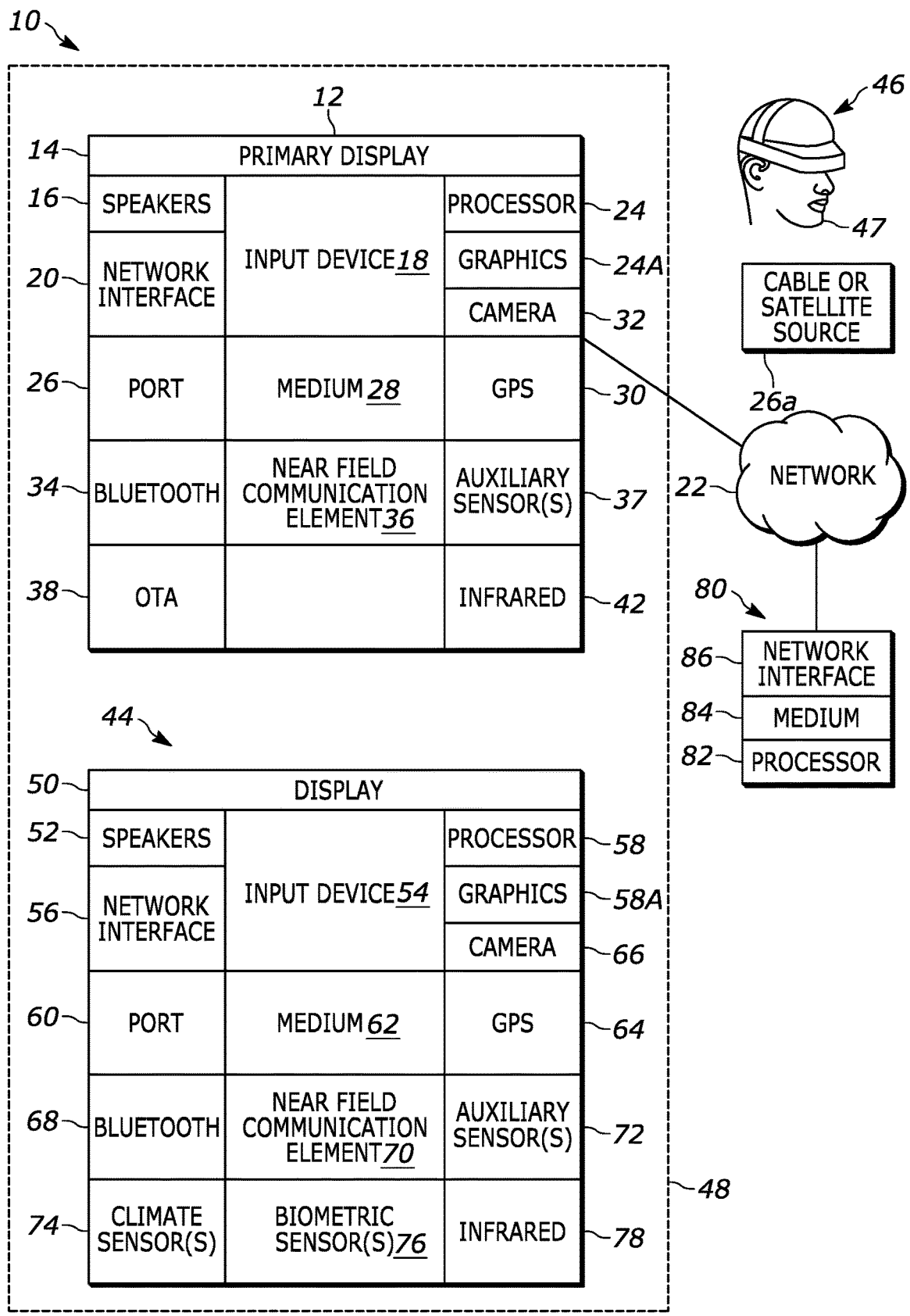
FIG. 1 is a block diagram of an example system consistent with present principles.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications. A system herein may include server and client components, connected over a network such that data may be exchanged between the client and server components. The client components may include one or more computing devices including game consoles such as Sony PlayStation® or a game console made by Microsoft® or Nintendo® or other manufacturer, virtual reality (VR) headsets, augmented reality (AR) headsets, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux® operating systems, operating systems from Microsoft®, or a Unix® operating system, or operating systems produced by Apple® or Google®. These operating environments may be used to execute one or more browsing programs, such as a browser made by Microsoft® or Google® or Mozilla® or other browser program that can access websites hosted by the Internet servers discussed below. Also, an operating environment according to present principles may be used to execute one or more computer game programs in accordance with present principles.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 (e.g., a central processing unit (CPU). A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to gather pictures/images and/or video in accordance with present principles.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee® also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47 that has one or more joysticks, one or more push buttons, etc. In the example shown, only two CE devices 44, 46 are shown, it being understood that fewer or greater devices may be used.

In the example shown, all three devices 12, 44, 46 may be members of an entertainment network, e.g., in a home/house or that is distributed over several locations. Thus, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, video game console, or video game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display(s) 50. Additionally, or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note that the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44, and/or the CE device 44 may be powered via wired connection to a wall outlet. The CE device 44 may communicate with the AVD 12 through any of the above-described communication modes and related components.

The second CE device 46 may include some or all of the components shown for the CE device 44. Either one or both CE devices may be powered by one or more batteries and/or wall outlet connections.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
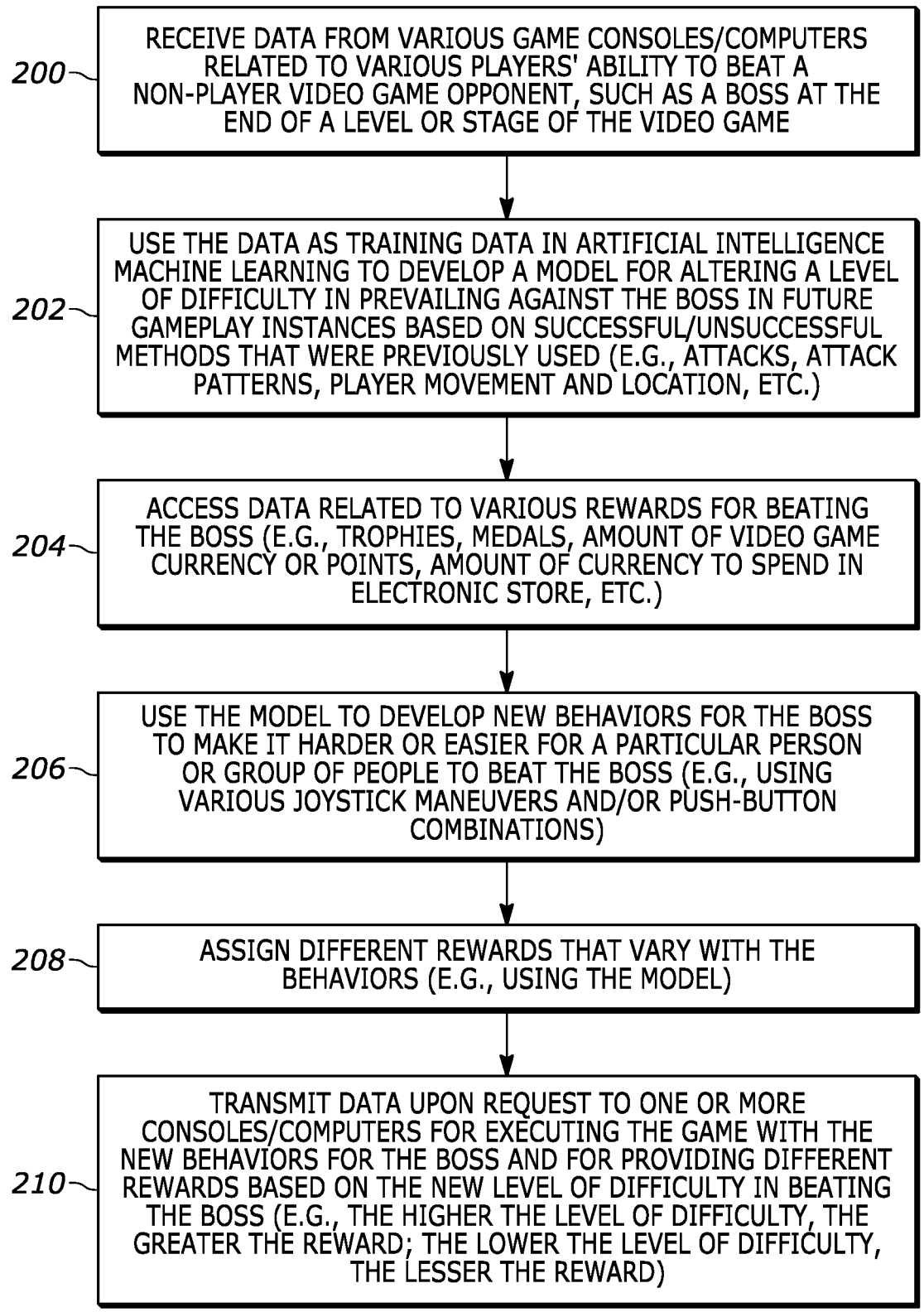
FIG. 2 is a flow chart of example logic that may be executed by a server or server farm in accordance with present principles for increasing or decreasing the level of difficulty in beating a non-player video game opponent.

Before moving on to the description of FIG. 2, it is to be understood in accordance with present principles that machine learning algorithms (established by artificial intelligence neural networks having input and output layers as well as multiple hidden layers in between) may be used to alter the behavior of a boss or other non-player-controlled video game opponent. As understood herein, machine learning may be a serialized process that involves identifying, obtaining, and preparing raw data sets, feature engineering and generating extract, transform, and load (ETL) jobs that transform the raw data into features for the machine learning models, and designing and coding the machine learning models. The models may be "trained" in a computing-intensive task that consequently may involve distributed computing architectures running on a large number of CPUs, GPUs, and emerging optimized chips for running specific algorithms such as deep learning. The models may even be evaluated for performance and latency. After a model is trained, the quality of its prediction and the time it takes for that model to provide that prediction may be evaluated. A "good" model can then be deployed in a production environment for providing inferences on how to circumvent certain attacks, attack patterns, or habits of a human video game player against the non-player opponent, or to make the opponent easier to beat if the player is having trouble beating the opponent.

To this end, reinforcement learning algorithms may be used along with dynamic programming and Markov decision processes (MDP). However, supervised and/or unsupervised learning algorithms may also be used. In any case, a model may be built by using as training data certain human player behavior data that indicates various moves and tactics used by various human video game players in the past to beat a given non-player opponent. The model may then be used to make inferences/predictions as to how the opponent might successfully avoid or counter that move, or even acquiesce in that move, to make beating the boss harder or easier, respectively.

Reference is now made to FIG. 2, which shows example logic that may be executed by a device or set of devices such as a server or server farm in accordance with present principles in order to use machine learning to alter the behavior and thus level of difficulty in beating a non-player video game opponent like a boss that is controlled by the video game system itself rather than a human being. Beginning at block 200, the device may receive data from various video game consoles or other computers executing a certain video game. The data may be related to various video game players' ability to beat a certain non-player video game opponent, e.g., a boss encountered at the end of a certain level of the video game or at the final level/stage of the video game. The opponent may also be another type of character, object, or entity that does not have a mutual interest with the human player in one or more goals the human player is trying to accomplish in the video game. For example, the opponent may be a rival race car driver, a neighbor in a simulation environment competing for resources with the human player, an opposing sports team composed of multiple virtual athletes controlled by the game console, a rival military of warriors or a rival space force, a group of zombies, etc.

Then at block 202 the device may use the data as training data to develop a machine learning model for altering a level of difficulty in prevailing against the boss in a future gameplay instance based on successful and/or unsuccessful methods or tactics that were previously used by the player(s) when controlling the player's video game character. The methods or tactics may include, as examples, particular attacks such as a flying punch, a low kick, etc. Certain attack patterns or sequences may also establish the methods/tactics, as well as certain player movements and location changes within the level or fighting environment in which the player tends to remain while fighting the boss/opponent.

From block 202 the logic may then move to block 204 where the device may access data related to various rewards that may be provided to the player for beating the boss. The data may be preset by the developer of the video game, and the rewards themselves may pertain to items such as trophies or medals that are awarded for beating the boss, an amount of video game currency or points that are awarded for beating the boss, or even an amount of currency to spend in an electronic store that is awarded for beating the boss and can be used by the player to make additional real-life purchases (e.g., in-game purchases for that game, purchasing other games, purchasing gaming hardware such as an additional video game controller, etc.).

After block 204 the logic may then move to block 206. At block 206 the device may use the model developed at block 202 to determine new behaviors for the boss. The new behaviors may make it more or less difficult to prevail against the boss, e.g. kill the boss and hence move on to the next level of the video game. The data used at block 202 to develop the model may be specific to only a certain player, or may be data from multiple players from the population at large that play the video game, or data from a subset of the population. Thus, the new behaviors determined at block 206 may be specific to only the certain player if the model is built based only on that player's data, or may be behaviors determined based on trends or patterns recognized from the multiple players if the model is built based on multiple players' data. In any case, the new behaviors may make it harder or easier for a player to beat the boss using various joystick maneuvers on a video game remote controller used by the player and/or using various push-buttons or push-button combinations on the video game remote controller.

For example, in terms of making it harder for a player to beat a boss or other opponent, machine learning may be used to identify that the boss does not move fast enough to avoid a punch, and accordingly infer that if the boss were to move in a certain direction at a faster speed than a speed at which the boss is currently set to move to avoid the punch then the punch will not strike the boss. As another example, if the player uses a certain weapon to defeat the boss and that weapon is successful, the machine learning model may infer that the boss should be allocated a shield or other object in the future that was not previously allocated to the boss in the past so that the boss may not be harmed by the weapon in future gameplay instances.

In terms of making it easier for a player to beat a boss or other opponent, as an example machine learning may be used to identify that a player or group of players are always defeated (or defeated more than a threshold percentage of total gameplay instances) when the boss uses a certain weapon or launches a certain attack sequence, and accordingly infer that the boss should stop using that weapon or attack sequence.

Then at block 208 the device may assign different rewards for beating the boss that vary with the new behaviors and thus increased or decreased level of difficulty in beating the boss. Outputs from the model that indicate whether the boss has been made more or less difficult to beat may be used for such purposes.

Thus, greater rewards may be assigned for beating the boss when a boss's level of difficulty is increased in response to a player or group of players beating the boss relatively easily or in more than a threshold percentage of total instances that the players attempt to beat the boss. The threshold percentage may be set by the video game developer where, e.g., the developer may wish that people beat the boss less than fifty percent of the times that they attempt to defeat the boss. Accordingly, greater rewards may be assigned to beating a boss tailored to exhibit new behavior (e.g., one or more particular moves or counter-moves) that is more sophisticated or complex to make it more difficult to beat the boss. The greater rewards may include more points or in-game currency being awarded for beating the boss relative to points or currency awarded for beating the boss before the boss's behavior was altered, as well as better trophies or medals such as gold trophies or medals as opposed to silver or bronze trophies or medals that might have been achieved prior to alteration of the boss's behavior.

Lesser rewards may also be assigned to beating the boss, should the boss be tailored to exhibit behavior that is less sophisticated or complex to make it easier to beat the boss. This situation might occur when a player or group of players either cannot beat the boss or have much difficulty in beating the boss (e.g., beat the boss less than the threshold percentage of instances as referenced above) since that can lead to a negative game experience. The lesser rewards may include less points or in-game currency being awarded for beating the boss relative to points or currency awarded for beating the boss before the boss's behavior was altered, as well as lesser trophies or medals such as bronze trophies or medals as opposed to gold or silver trophies or medals that might have been achieved prior to alteration of the boss's behavior.

From block 208 the logic may then proceed to block 210 where the device may transmit data to one or more consoles or other computers that have installed copies of the video game to update the video game with the new behaviors of the boss and with the different rewards that have been assigned to beating the altered boss. In some examples, the device may only transmit the data to the one or more consoles responsive to respective pull requests from the consoles that request the data, e.g., during a game update executed at the respective consoles. However, in other examples the device may "push" the data to the one or more consoles even without receiving respective requests for the data from the one or more consoles. The consoles/computers may then update using the data, as reflected in FIG. 3.

Figure 3:
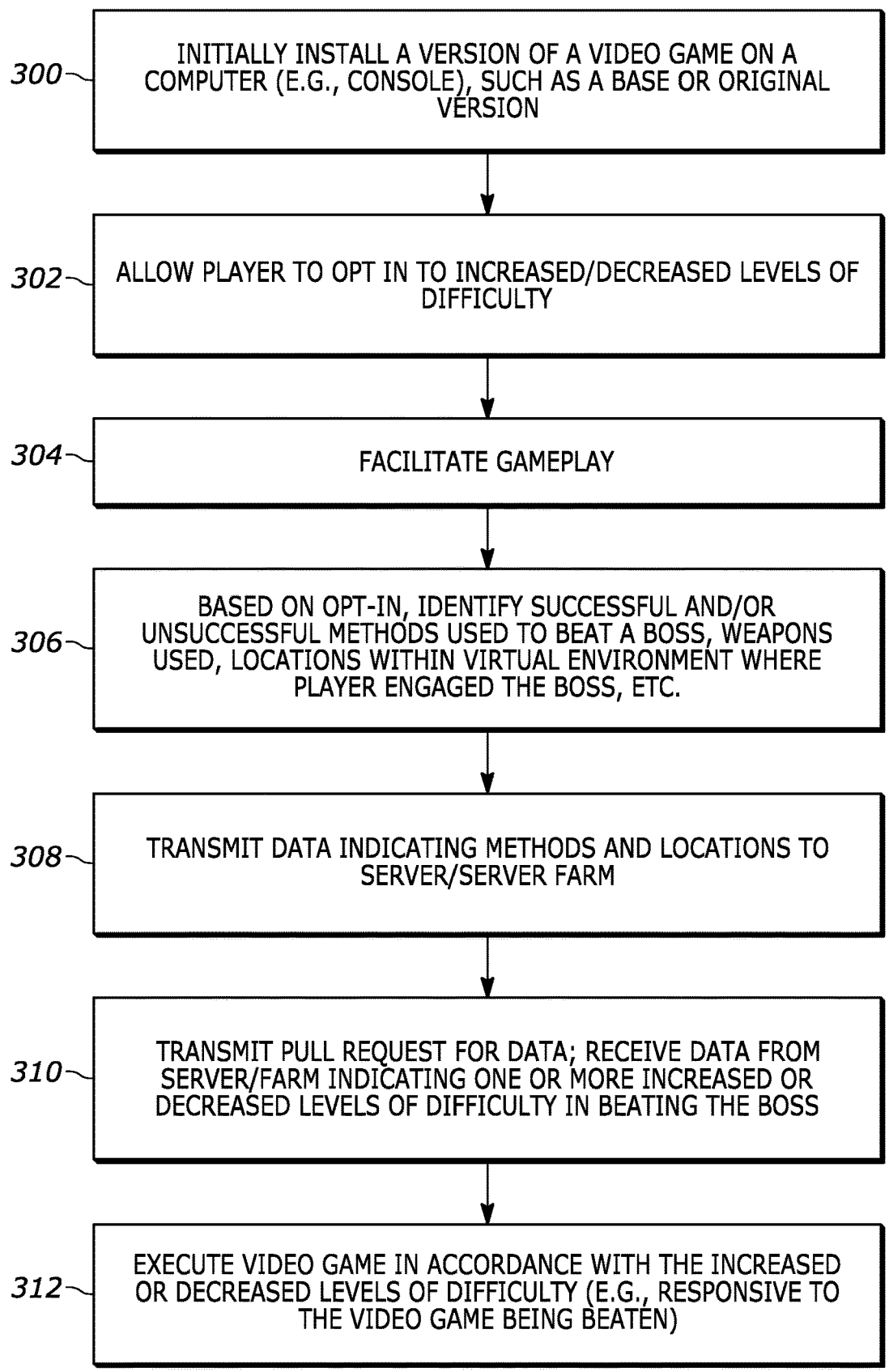
FIG. 3 is a flow chart of example logic that may be executed by a video game console or other consumer electronics device for operating a video game in accordance with one or more increased or decreased levels of difficulty in beating a non-player video game opponent.

Accordingly, reference is now made to the example logic of FIG. 3, which may be executed by a device such as a video game console or other computer configured for executing a video game for play by a person. Beginning at block 300, the device may install a certain version of the video game on the device. For instance, the version may be region-specific (e.g., an American version as opposed to European version). The version may also be a base or otherwise original version of the video game prior to any subsequently-released updates downloadable over the Internet.

From block 300 the logic may then proceed to block 302 where the device may allow the player to opt in to using increased and/or decreased levels of difficulty in beating one or more bosses in accordance with present principles. An example of how a player may opt in will be described further below in reference to FIG. 4. But still in reference to FIG. 3, from block 302 the logic may then proceed to block 304.

At block 304 the device may facilitate gameplay where the human player may play the video game and attempt to progress through various levels or stages of the video game. Then at block 306 the device may, based on the player previously opting in, identify or otherwise collect data on successful or unsuccessful methods that might have been used to beat a certain boss within the game, as well as any weapons that might have been used in the attempts to beat the boss, locations within the virtual environment of the game where the player engaged the boss, etc. For instance, if the video game is designed for the player to engage the boss within a preset virtual geographic area within a particular level of a game (such as a virtual room or even a virtual stadium) and the player uses a sword in an attempt to beat the boss within that area, the locations within the area at which the player engaged the boss as well as data indicating sword use may be collected.

Then at block 308 the device may transmit the data identified or collected at block 306 to a server or server farm in accordance with present principles. Thereafter, the logic may proceed to block 310 where the device may receive data back from the server or server farm indicating one or more increased or decreased levels of difficulty in beating the boss in accordance with present principles. For example, for increased difficulty the device may receive back a game update that includes additional combat moves to be performed by the boss that make it more difficult to beat the boss or that might be specifically tailored to counter moves used by the player in the past to beat the boss. As another example, for decreased difficulty the device may receive back a game update specifying that the boss move slower and refrain from using a combat move that was previously effective in beating the player.

Also, note that in some examples at block 310, the device may transmit a pull request to the server or server farm that requests the data before actually receiving the data at block 310. However, in other examples the device may simply receive the data at block 310 if "pushed" from the server of server farm without a pull request from the device executing the logic of FIG. 3.

From block 310 the logic of FIG. 3 may then proceed to block 312 where the device may execute the video game in accordance with the increased or decreased level of difficulty. Block 312 may be performed, for instance, immediately after receiving the update from the server or server farm so that the next time the player encounters the boss, the boss exhibits the increased or decreased level of difficulty. However, block 312 may also be performed at other times, such as responsive to console/computer startup after the player has taken a break from playing the video game, responsive to the game application being launched again after it was shut down, or even responsive to the player beginning the game anew and from the beginning such that the boss is not updated for a subsequent attempt to beat the boss until the player has progressed through and beaten the whole game a first time (or at least starts a "new game").

As described above, a player may be given the opportunity to opt in to the video game increasing or decreasing the level of difficulty in beating one or more bosses or other opponents. This opportunity may occur the first time a user installs or otherwise boots the video game on his or her device, and the option may be provided as part of the game's initial tutorial process that acclimates the player to the game, various controller moves to use when playing the game, goals of the game, etc. The player may also access settings for the video game at a later time after playing some of the video game in order to opt in, or to opt out after opting in.

Thus, an example settings graphical user interface (GUI) 400 is shown in FIG. 4 for a player to provide input to opt in and to configure other settings. It is to be understood that each of the options or sub-options to be described below may be selected by providing touch or cursor input to the adjacent check box in order to select the option or sub-option.

As shown in FIG. 4, an option 402 may be presented on the GUI 400 and selected to configure the device/video game for opt in to increase or decrease the level of difficulty in beating bosses or other opponents based on the player's own joystick and push-button habits or moves, weapon use, etc. An option 404 may also be presented for opting in to using bosses/opponents as already altered based on a set of other people's gameplay data. Thus, sub-options may be presented under the option 404 for selecting bosses/opponents already altered based on the play of a particular set or subset of people. For instance, sub-option 406 may be selected to select the population at large while sub-option 408 may be selected to select people from the player's own friends list who have also played the same video game.

Other sub-options 410 may also be selected for selecting use of bosses/opponents already altered based on the gameplay of a subset of different types of video game players that have had their gameplay habits grouped together. For instance, a subset of players that primarily play electronic sports (e-sports) game types may be selected, as may subsets for people that play first person shooter (FPS) game types, simulation game types, and role playing game (RPG) types.

The GUI 400 may include still other options that are configurable by the player. For instance, options 412, 414, and 416 may be presented for selection to implement boss alterations mid-gameplay whenever alterations are received (option 412), to implement alterations responsive to a next console startup, game update, or game application launch (option 414), or to implement alterations when a new game is began from the beginning level or stage of the game (option 416).

Options 418 and 420 may also be presented. Option 418 may be selected for the device or video game to only perform alterations for bosses specifically, while option 410 may be selected to perform difficulty level alterations for all non-player opponents that a person might encounter when playing the video game.

In some examples, the GUI 400 may even include options 422-428 for selecting one or more particular bosses or other non-player opponents for which to implement difficulty level alterations in accordance with present principles. This may be done so that a player may opt in to playing against certain non-player opponents who have their difficulty level adjusted, while also playing against other non-player opponents of the same game that have not had their difficulty level adjusted and instead have their difficulty level remain at a default or initial level. Thus, an option 422 may be selected to configure the device or video game to perform difficulty level alterations for all bosses or all non-player opponents. Option 424 may be selected to configure the device or video game to perform difficulty level alterations only for the boss at the end of level one of the video game, and option 426 may be selected to configure the device or video game to perform difficulty level alterations only for the boss at the end of level two of the video game. Furthermore, option 428 may be selected to configure the device or video game to perform difficulty level alterations only for the final boss at the very end of the video game, e.g., the last or final level of the video game.

Figure 5:
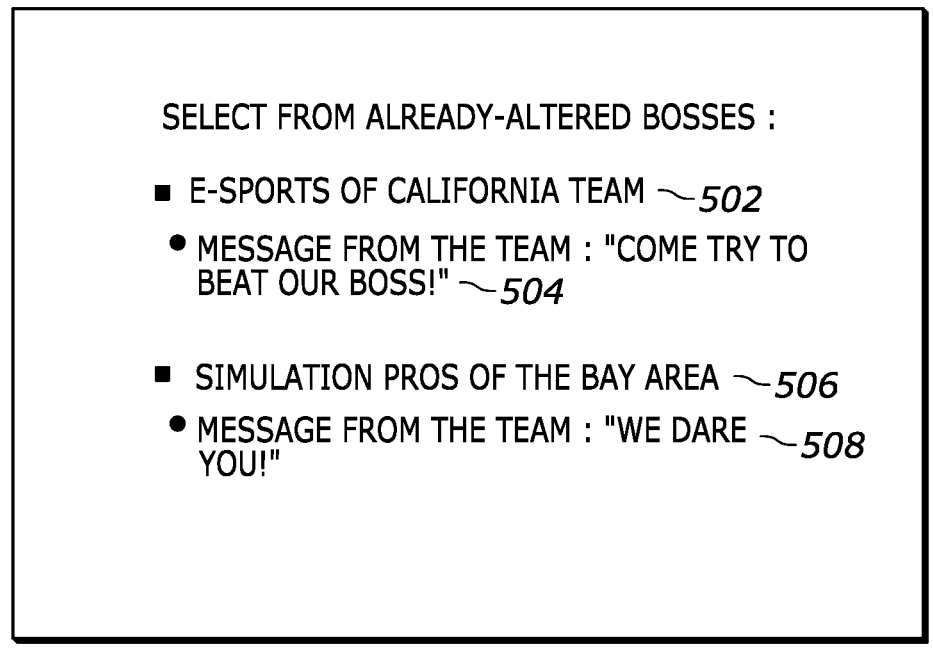

FIG. 5 shows yet another example opt-in GUI 500. The GUI 500 may be presented as part of the GUI 400, or may be presented separately. In any case, the GUI 500 may include various options that may be selectable via touch or cursor input to select a version of a boss for a given video game that has had its difficulty level altered already based on the gameplay of a particular team of players that participate together, e.g., in video game demonstrations or competitions. A boss tailored to these groups of players may generally exhibit a difficulty level that makes the boss more difficult to beat in response to the team's more sophisticated gameplay abilities.

As shown, the boss altered based on gameplay by the team "E-Sports of California" may be selected via option 502. The option 502 may even be accompanied by a playful message 504 from the team itself, e.g., if the team is given the option to make its version of the boss available to others. The message in this case indicates, "Come try to beat our boss!"

Another example option 506 may also be presented for selection of a boss version altered based on gameplay for the same video game but by the team "Simulation Pros of the Bay Area". A message 508 from this team may also be included, such as "We dare you!"

It may now be appreciated that machine learning may be used to make non-player opponents a person might face in a video game harder to defeat if the person or others are beating the opponents too easily, or easier to defeat if people are having difficulty beating the opponents. Training data from people that have already faced a given non-player opponent may be used to build a model specific to that non-player opponent, and then the model may be used to update the opponent with new or different tactics or moves. In some examples, a boss or other non-player opponent may even become more able to defend against a specific player's attack patterns, or to defend against the attack patterns of the general population.

What's more, some bosses may have their evolution throttled relative to other bosses so that the former may evolve faster and hence become more difficult to beat faster, whereas other bosses may evolve at a slower rate. This may be configured by the video game's developer so that, for instance, a boss encountered at a first level of a video game remains relatively easy to beat even after many people beat that boss, whereas a final level boss may evolve much faster and thus may become much more difficult to beat if many people are beating it.

In some examples, the video game's developer may even set a threshold for the frequency with which a given boss is to be actually defeated relative to total attempts to defeat the boss. For example, the video game developer could set the threshold for people to beat a certain boss fifty percent of the time on average, and therefore the machine learning model may refine the boss's level of difficulty up or down over time until the fifty percent average is reached for a most-recent X number of attempts to beat the boss by the population at large, a subset of the population, or even a specific player.

Present principles may also be used, for example, in simulation games where players are dropped into an unknown virtual world and attempt to figure out the world and simulate living in and interaction within the world. In such an example, the video game may then get "smarter"—e.g. more difficult for the player to progress—as more and more people play the video game and more training data becomes available.

Different awards may even be given out to a player who beats a boss with an altered level of difficulty relative to an award that might be given out by default based on a default level of difficulty for the boss set by the video game's developer. The different award may even be triggered based on play against the boss reaching a certain amount of time threshold and/or training data amount threshold. For instance, if a player were to beat a boss altered based on the general population's ability to defeat the boss but only two weeks after the video game has been released to the public, and/or after training data for only twenty people has been made available, a more moderate award increase may be provided despite boss alteration. In contrast, a person that beats the same boss six months after the video game has been released and with one hundred thousand people's training made data available, and thus with the boss altered on a more refined level owing to the increased training data amount, may instead be provided with a more significant award for beating the boss. Again, the award may relate to a trophy, video game points, video game currency, currency for use in e-commerce, etc. Other threshold types may also be used in relation to available training data and increasing awards, such as total hours played for the video game by a person, group of people, or population at large, and/or time spent on each specific level at which a boss that is to be altered is encountered.

Moreover, as referenced above a certain boss may be made more smart or sophisticated for a certain population so that nuances of what is required to beat the boss are function of the population's characteristics or tendencies. For instance, if many e-sports people are already accustomed to using certain tricks (e.g., controller joystick sequences or push-button combinations) that prove highly useful in beating a certain boss, that boss's level of difficulty may be made harder for people classified as being part of the e-sports population. But, the same boss might actually maintain a default level of difficulty or actually exhibit a decreased level of difficulty for agnostic or casual gamers since beating the e-sports tailored boss might prove too difficult for that group.

As also referenced above, a boss or other non-player opponent may be tailored through machine learning based on a number of factors. Those factors may include the sequence and complexity of joystick maneuvers used to beat the boss, which buttons and/or which button combinations were used to beat the boss, which weapon(s) were used to beat the boss, where within the virtual environment the human player's character was standing when the player beat the boss, etc. In some examples, the server or server farm performing the machine learning may even analyze the human player's movement of his or her virtual character throughout the battle with the boss and generate a heat map to identify where the human player's character was located most often when engaging the boss to then tailor the boss to avoid those areas, or to even focus on being present at those areas if the human player is otherwise evasive so that the server can develop counter-attacks that may be effective in those areas.

It will be appreciated that whilst present principals have been described with reference to some example embodiments, these are not intended to be limiting, and that various alternative arrangements may be used to implement the subject matter claimed herein.

What is claimed is:

1. A method, comprising:
receiving data related to one or more video game players' attempt to beat a video game opponent;
determining, based on the data, a different way for beating the video game opponent in the future; and
altering gameplay against the video game opponent based on the different way for beating the video game opponent in the future, wherein the determining and altering are executed by at least one computer using at least one machine learning algorithm comprising a serialized process that involves identifying, obtaining, and preparing raw data sets, feature engineering and generating extract, transform, and load (ETL) jobs that transform the raw data sets into features for the machine learning algorithms, the machine learning algorithm being produced by evaluating plural models evaluated for performance and latency with the machine learning algorithm being selected from the model whose quality of prediction is better than other models, the machine learning algorithm providing inferences on how to circumvent certain attacks, or attack patterns, or habits of a human video game player, or to make the video game opponent easier to beat if a player of the video game is having trouble beating the video game opponent.

2. The method of claim 1, wherein the video game opponent is a non-player character of a video game.

3. The method of claim 2, wherein the non-player character is a boss that is engaged at the end of a level or stage of the video game.

4. The method of claim 1, wherein the different way for beating the video game opponent in the future is tailored to a particular video game player for play by the particular video game player to circumvent a particular attack or attack pattern waged against the video game opponent by the particular video game player.

5. The method of claim 1, wherein the different way for beating the video game opponent in the future is tailored for play by multiple video game players in separate gameplay instances to circumvent a particular attack or attack pattern waged against the video game opponent by plural video game players.

6. The method of claim 1, wherein the different way for beating the video game opponent in the future is tailored based on a particular subset of video game players.

7. The method of claim 6, wherein the particular subset is selected from the group consisting of: electronic sports video game players, first person shooter video game players, simulation video game players, role playing game video game players.

8. The method of claim 1, wherein the different way for beating the video game opponent in the future is tailored for increased or decreased joystick maneuver difficulty in beating the video game opponent.

9. The method of claim 1, wherein the different way for beating the video game opponent in the future is tailored for increased or decreased push-button combination difficulty in beating the video game opponent.

10. An apparatus, comprising:
at least one computer readable storage medium that is not a transitory signal and that comprises instructions executable by the at least one processor to:
identify a version of a video game on a computer;
receive data from a server indicating one or more increased or decreased levels of difficulty in beating one or more opponents of the video game;
execute the video game in accordance with the one or more increased or decreased levels of difficulty in beating the one or more opponents; and
present at least one user interface (UI) comprising:
at least a first selector to opt in to increase or decrease the level of difficulty based on gameplay of a player of the video game on the computer, and at least a second selector to opt in to using bosses/opponents of the video game as already altered based on a set of gameplay data from people other than the player.

11. The apparatus of claim 10, wherein the second selector comprises:
a first sub-option to select the set of gameplay data from a first set of people other than the player and a second sub-option to select the set of gameplay data from a second set of people.

* * * * *